United States Patent
Okada

(10) Patent No.: US 8,159,699 B2
(45) Date of Patent: Apr. 17, 2012

(54) PRINTING APPARATUS, PROGRAM, AND METHOD FOR PERFORMING COPY NUMBER PRINTING ON DOCUMENT HAVING MATCHING FILE NAME AND NUMBER OF PRINTED COPY STORED

(75) Inventor: Hideyuki Okada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1062 days.

(21) Appl. No.: 11/684,001

(22) Filed: Mar. 8, 2007

(65) Prior Publication Data

US 2007/0211282 A1    Sep. 13, 2007

(30) Foreign Application Priority Data

Mar. 9, 2006 (JP) ................................. 2006-064050

(51) Int. Cl.
G06F 3/12 (2006.01)
G06K 15/00 (2006.01)
(52) U.S. Cl. ...................... 358/1.15; 358/1.13; 358/1.18
(58) Field of Classification Search .......................... None
See application file for complete search history.

(56) References Cited

U.S. PATENT DOCUMENTS

| | | | | |
|---|---|---|---|---|
| 6,331,900 | B1 * | 12/2001 | Kuno | 358/1.9 |
| 2003/0043405 | A1 * | 3/2003 | Hill | 358/1.15 |
| 2004/0161256 | A1 * | 8/2004 | Ando | 399/79 |
| 2005/0267797 | A1 * | 12/2005 | Takahashi et al. | 705/11 |
| 2006/0109493 | A1 * | 5/2006 | Toda | 358/1.13 |
| 2006/0176512 | A1 * | 8/2006 | Nishimura | 358/1.15 |

FOREIGN PATENT DOCUMENTS

| | | |
|---|---|---|
| JP | 08-067046 A | 3/1996 |
| JP | 2005-305671 A | 11/2005 |
| JP | 2006-005442 A | 1/2006 |

* cited by examiner

Primary Examiner — Benny Tieu
Assistant Examiner — Fan Zhang
(74) Attorney, Agent, or Firm — Rossi, Kimms & McDowell LLP

(57) ABSTRACT

A printing apparatus which is capable of eliminating a burden on an operator in managing a copy number on a printout and improving security for the printout when a function for printing the copy number on the printout is realized. Printing based on a print job is performed, and a copy number set in units of copies on a printout generated by the printing is printed. Number of printed copies information corresponding to the number of printed copies of the print job is stored, in association with the print job. When the print job stored in a memory section 27 is printed, a printer section 26 prints the copy number on the printout based on the number of printed copies information associated with the print job.

4 Claims, 14 Drawing Sheets

PRINTING APPARATUS, PROGRAM, AND METHOD FOR PERFORMING COPY NUMBER PRINTING ON DOCUMENT HAVING MATCHING FILE NAME AND NUMBER OF PRINTED COPY STORED

BACKGROUND OF THE INVENTION

1. Field of the Invention

The present invention relates to a printing apparatus provided with a function of printing a copy number on a printout, a printing method therefor, and a program for implementing the printing method.

2. Description of the Related Art

Conventionally, in an image forming apparatus that prints highly confidential documents, it is a general practice to improve security by using an information leakage prevention function provided in the image forming apparatus. For example, an image forming apparatus has been proposed which is provided with the information leakage prevention function so that highly confidential document data stored in the apparatus may not be improperly printed (see Japanese Laid-Open Patent Publication (Kokai) No. 2006-005442, for example). However, in addition to preventing the confidential documents from being improperly printed, security for printout after being outputted has increased in importance.

For example, in an office or the like, there is often the case where the highly confidential document is outputted as the printout by using a printing apparatus and the printout are distributed to participants in a conference or the like. In such a case, the printed documents are generally collected after the conference or the like is finished, in order to prevent information leakage. The printing apparatus used in this case includes a printing apparatus provided with "copy number printing function" for printing a serial number as a watermark on the document to be outputted in units of number of copies. Typically, a copy number showing what number of copies the printout is, is used as this serial number (see Japanese Laid-Open Patent Publication (Kokai) No. 2005-305671, for example).

With this copy number printing function, it is unnecessary for a distributor of the printout to previously record the number of printed copies, the number of distributed copies and the like in a memo or the like before printing and distributing the documents. Moreover, when the printout are collected, the distributor can easily check whether or not there is leakage in the collection only by checking the serial number printed on the collected printout. Therefore, it is unnecessary to perform a task of checking the number of collected copies, comparing it with the numbers of printed and distributed copies, and checking whether or not the printout have been certainly collected. Furthermore, previously understanding a relationship between the printed copy number and the distributor enables to trace a source of leakage when the printout is leaked to the outside. In this way, the above described copy number printing function has been an important function recently in a printing market in which security is regarded as important.

However, although the copy number printing function in the above described conventional printing apparatus is a function which is effective in security, this function has a problem of a troublesome task in performing an additional printing while retaining the copy number to be printed, which imposes a significant burden on an operator.

For example, it is assumed that the operator has set the copy number printing function as enabled and has printed 10 copies of the confidential document, and as a result, has obtained the printout with the copy numbers from "1" to "10" printed thereon. Afterward, when the additional printing is performed, the operator has to set a starting number of the copy number to "11", which comes after "10", to execute the printing. However, at this point, the same copy number may be printed on the same document due to a mistake in the setting of the copy number and the like. If the same copy number has been printed, the collection of the documents cannot be easily checked, and in addition to that, the source of leakage cannot be traced when the printout is leaked to the outside, which becomes a significant drawback in terms of security. To prevent such a situation, the operator has to constantly operate in consideration of the copy number to be printed.

In addition, if the document is shared among multiple users, all users sharing the document have to consider the current copy number of the document, which makes management of the copy number further cumbersome and imposes a significant burden on the operator.

SUMMARY OF THE INVENTION

The present invention provides a printing apparatus, a printing method therefor, and a program for implementing the method which are capable of eliminating a burden on an operator in managing a copy number on a printout and improving security for the printout when a function for printing the copy number on the printout is realized.

In a first aspect of the present invention, there is provided a printing apparatus comprising a printer unit adapted to perform printing based on print data and to print a copy number set in units of copies on a printout generated by the printing, and a storage unit adapted to store number of printed copies information corresponding to the number of printed copies of the print data, in association with the print data, and when the print data stored in the storage unit is printed, the printer unit is adapted to print the copy number on the printout based on the number of printed copies information associated with the print data.

After execution of the printing for a predetermined number of copies by the printer unit, the storage unit can be adapted to set the print data as print data requiring an authentication when the printing thereof is executed, and store the print data with the number of printed copies information.

After execution of the printing for a predetermined number of copies by the printer unit, when the number of printed copies is not less than the number of copies permitted for the printing which has been previously set, the storage unit can be adapted to set the print data as print data requiring an authentication when the printing thereof is executed, and to store the print data with the number of printed copies information.

The printer unit can be adapted to use the print data which has already been stored in the storage unit, as the print data to be printed.

In a second aspect of the present invention, there is provided a printing method applied to a printing apparatus having a function for performing printing based on print data and printing a copy number set in units of copies on a printout generated by the printing, the method comprising the steps of storing number of printed copies information corresponding to the number of printed copies of the print data, in association with the print data, and printing the copy number on the printout based on the number of printed copies information on the print data when the stored print data is printed.

In a third aspect of the present invention, there is provided a computer-executable program stored in a computer readable medium, the program for implementing a printing method applied to a printing apparatus having a function for performing printing based on print data and printing a copy number set in units of copies on a printout generated by the printing, the program comprising the steps of storing number of printed copies information corresponding to the number of printed copies of the print data, in association with the print data, and printing the copy number on the printout based on the number of printed copies information on the print data when the stored print data is printed.

According to the present invention, the printing apparatus are capable of eliminating the burden on the operator in managing the copy number and improving security for the printout when the function for printing the copy number on the printout is realized.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
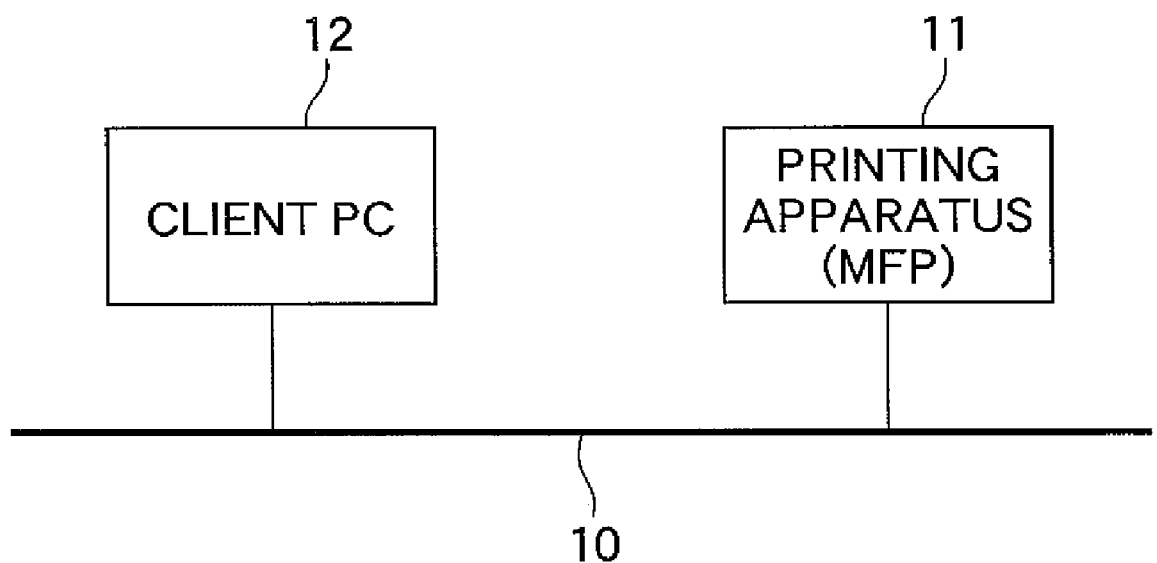
FIG. 1 is a block diagram schematically showing the configuration of a printing system including a printing apparatus according to a first embodiment of the present invention.
Figure 2:
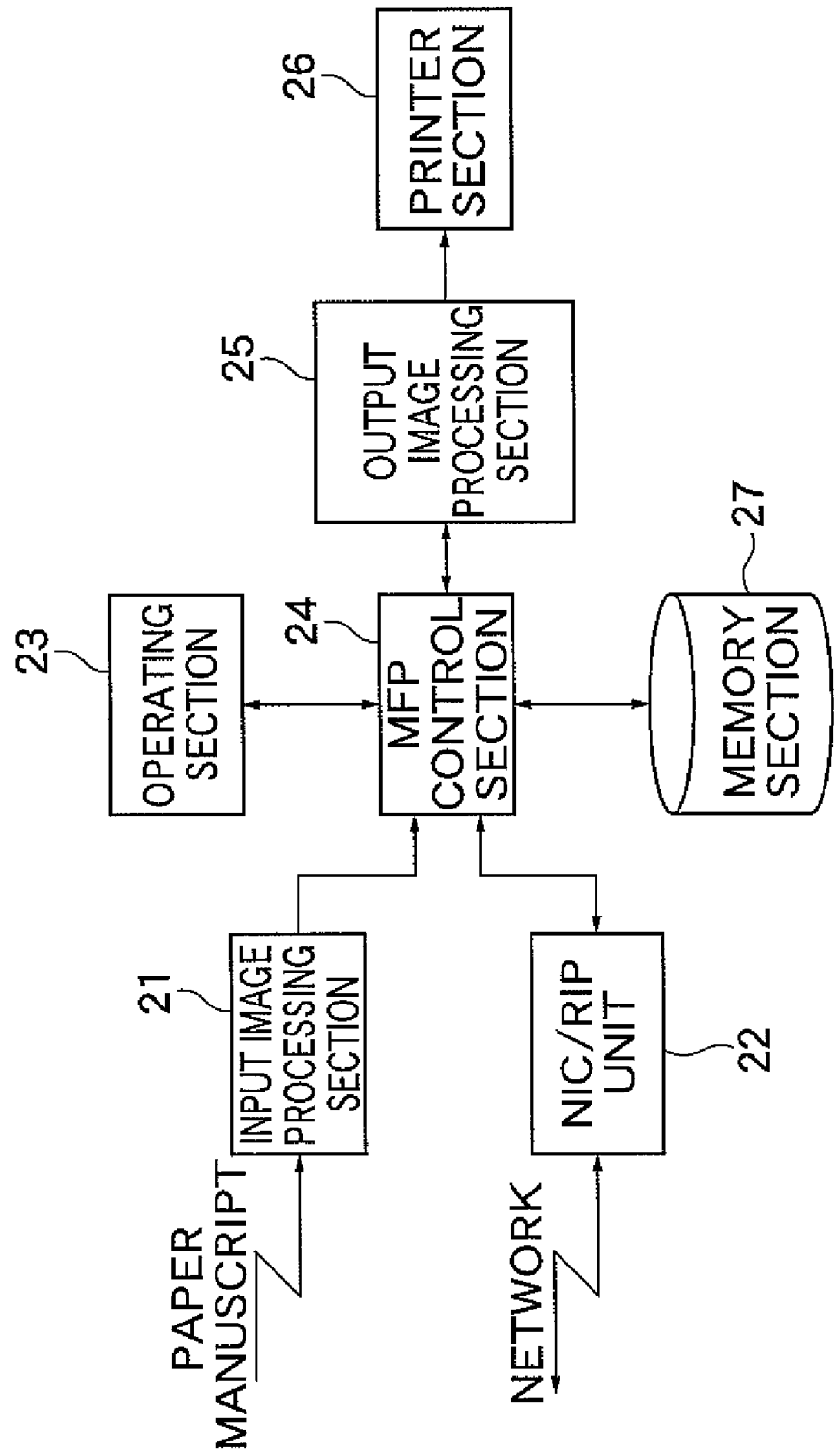
FIG. 2 is a block diagram schematically showing the configuration of the printing apparatus (MFP) in FIG. 1.

FIG. 1 is a block diagram schematically showing the configuration of a printing system including a printing apparatus according to a first embodiment of the present invention. FIG. 2 is a block diagram schematically showing the configuration of the printing apparatus (MFP) in FIG. 1.

As shown in FIG. 1, the printing system is comprised of a digital Multi Function Peripheral (hereinafter referred to as "MFP") 11 which is a configuration example of the printing apparatus according to the embodiment, and a client PC 12, both of which are connected via a network 10.

The MFP 11 is comprised of an input image processing section 21, a NIC/RIP unit 22, an operating section 23, a MFP control section 24, an output image processing section 25, a printer section 26 and a memory section 27. The input image processing section 21 processes image data read from a paper manuscript, and the NIC/RIP unit 22 performs a process of connecting to the network, and a RIP process of print data received via the network. The operating section 23 provides a user interface for a user, and the MFP control section 24 performs overall control of operations of respective modules. The output image processing section 25 performs processes such as forming or filtering of an output image. The printer section 26 performs printing of the output image sent from the output image processing section 25 and prints a copy number set in units of copies on a printout generated by the printing. The memory section 27 is connected to the MFP control section 24, and stores a print job and number of printed copies information corresponding to the number of printed copies of the print job in association with the print job. When the print job stored in the memory section 27 is printed, the printer section 26 prints the copy number on the printout based on the number of printed copies information associated with the print job.

Next, operations of the printing system of FIG. 1 will be described with reference to FIGS. 3 to 8.

Figure 3:
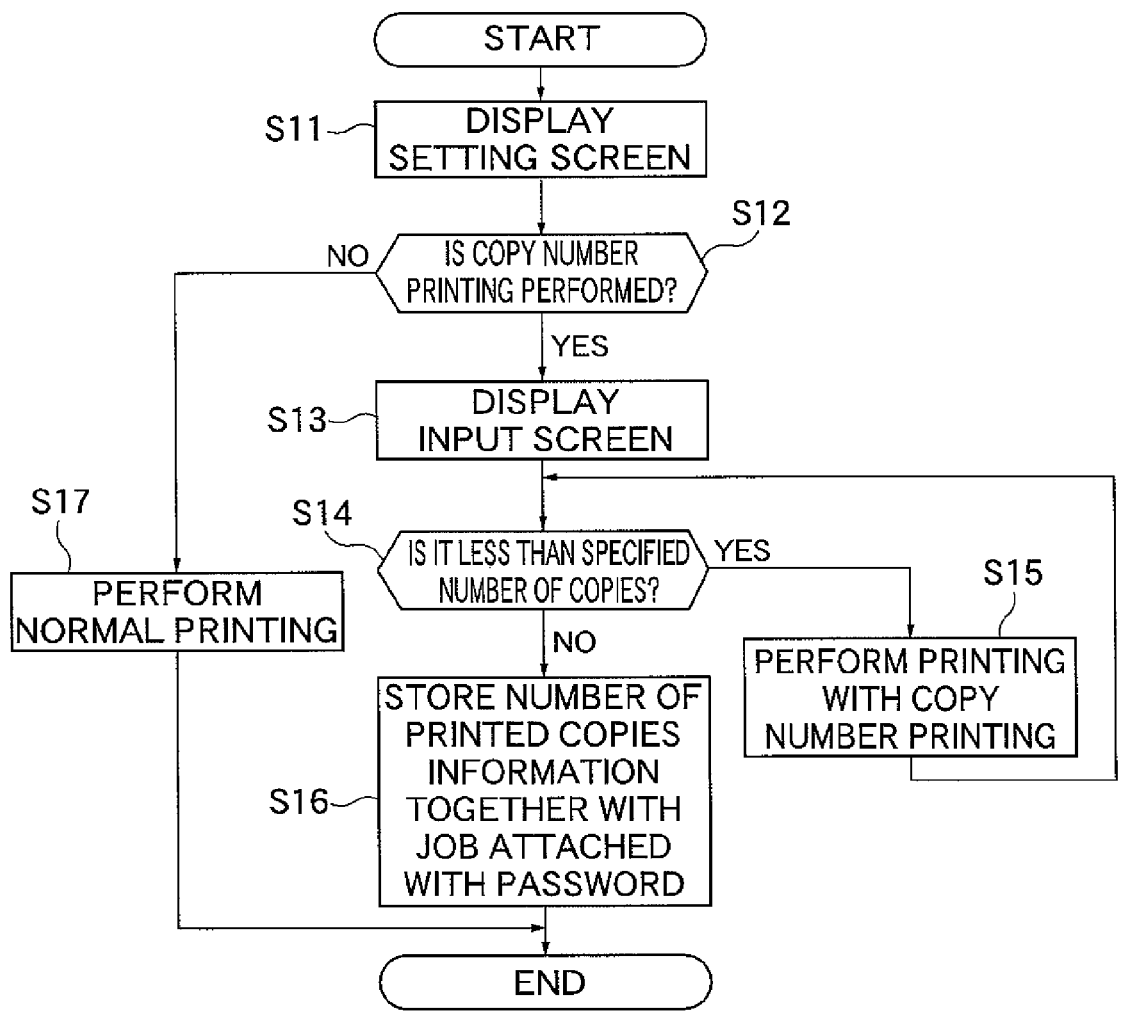
FIG. 3 is a flowchart showing a printing process of the printing system of FIG. 1 when a print job is inputted therein.
Figure 4:
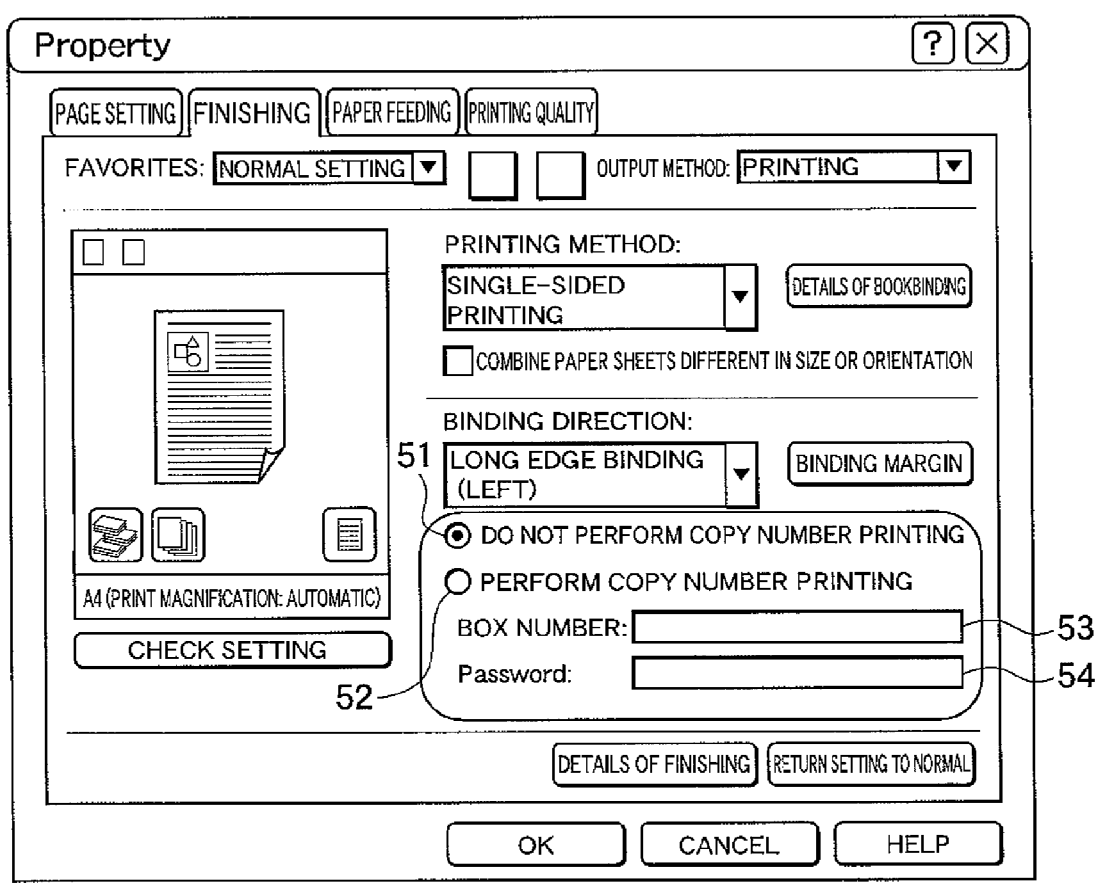
FIG. 4 is a diagram showing a copy number printing function ON/OFF setting screen displayed on a client PC in FIG. 1.
Figure 5:
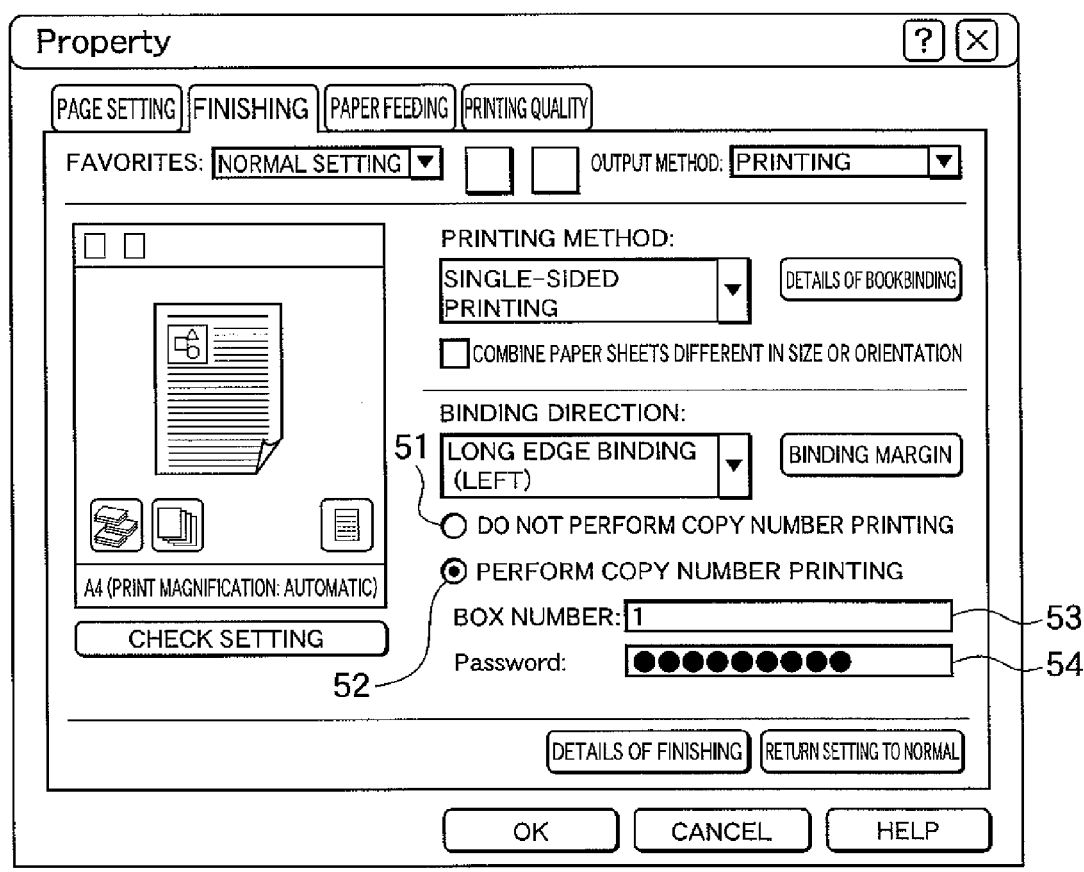
FIG. 5 is a diagram showing a box number/password input screen displayed on the client PC in FIG. 1.

FIG. 3 is a flowchart showing a printing process of the printing system of FIG. 1 when the print job is inputted therein. FIG. 4 is a diagram showing a copy number printing function ON/OFF setting screen displayed on the client PC 12 in FIG. 1, and FIG. 5 is a diagram showing a box number/password input screen displayed on the client PC 12 in FIG. 1.

In FIG. 3, the user inputs the print job from the client PC 12 into the MFP 11, in order to perform a copy number printing with respect to a highly confidential document. At this point, a printer driver of the client PC 12 displays a setting screen as shown in FIG. 4 on a panel of the operating section 23 (step S11), and it is determined whether or not the copy number printing is executed, based on the user's selection of radio buttons 51 or 52 on the screen (step S12). If the radio button 51 for "Do not perform copy number printing" is selected, the copy number printing is not performed and a normal printing is performed in accordance with a specified number of copies of the document (step S17), and then this process is completed. If the radio button 52 for "Perform copy number printing" is selected, the input screen as shown in FIG. 5 is displayed on the panel of the operating section 23 (step S13), and an input area 53 for "Box number" and an input area 54 for "Password" become input waiting state to prompt the user to input a box number and a password.

In the case where "Perform copy number printing" is selected, when the box number and the password are inputted and the printing is started in the step S13, it is determined whether or not the number of copies for which the print job has been executed is less than the specified number of copies for the copy number printing (step S14). If the number of copies for which the print job has been executed is less than the specified number of copies for the copy number printing, a printing for the print job involving the copy number printing (a printing with copy number printing) is executed in accordance with the specified number of copies (step S15). Then, when the number of copies for which the print job has been executed is not less than the specified number of copies for the copy number printing, that is, when the printing according to the specified number of copies is completed (NO to the step S14), the print job is stored as a job attached to the password (a job requiring an authentication for executing the printing thereof) in the memory section 27 (step S16). At this point, as an attribute of the print job, information showing the number of printed copies (number of printed copies information) is stored in the memory section 27. This storing in the memory section 27 indicates, for example, storing in an HDD by using a box function of the MFP 11, storing by inputting the print job at a waiting state in a print cue and the like.

Next, a process in the case of performing an additional printing of the above described document will be described.

Figure 6:
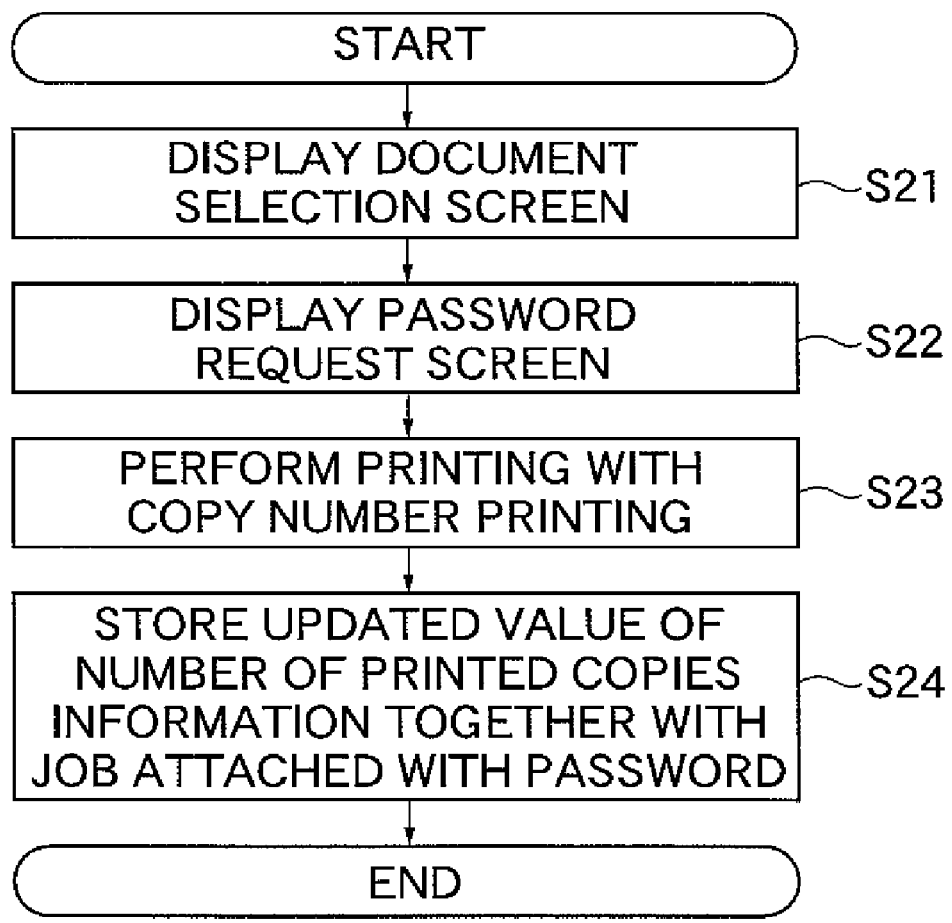
FIG. 6 is a flowchart showing a process executed by the MFP of FIG. 2 when an additional printing is performed.
Figure 7:
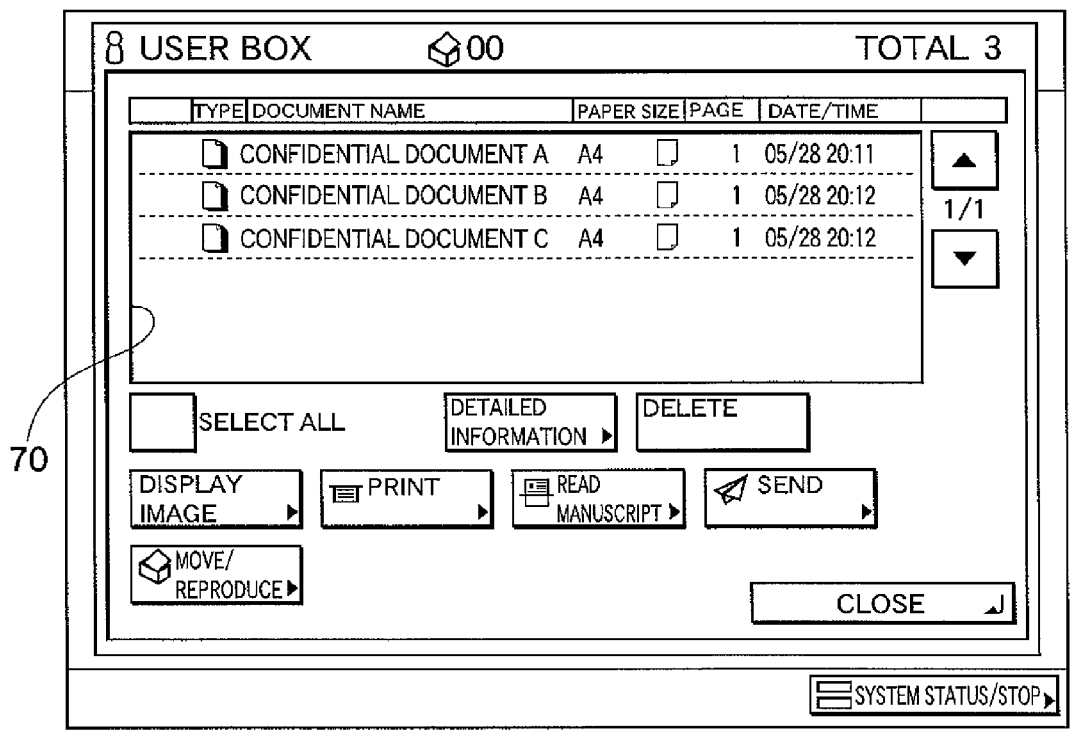
FIG. 7 is a diagram showing a document selection screen displayed on an operating section in the MFP of FIG. 2.
Figure 8:
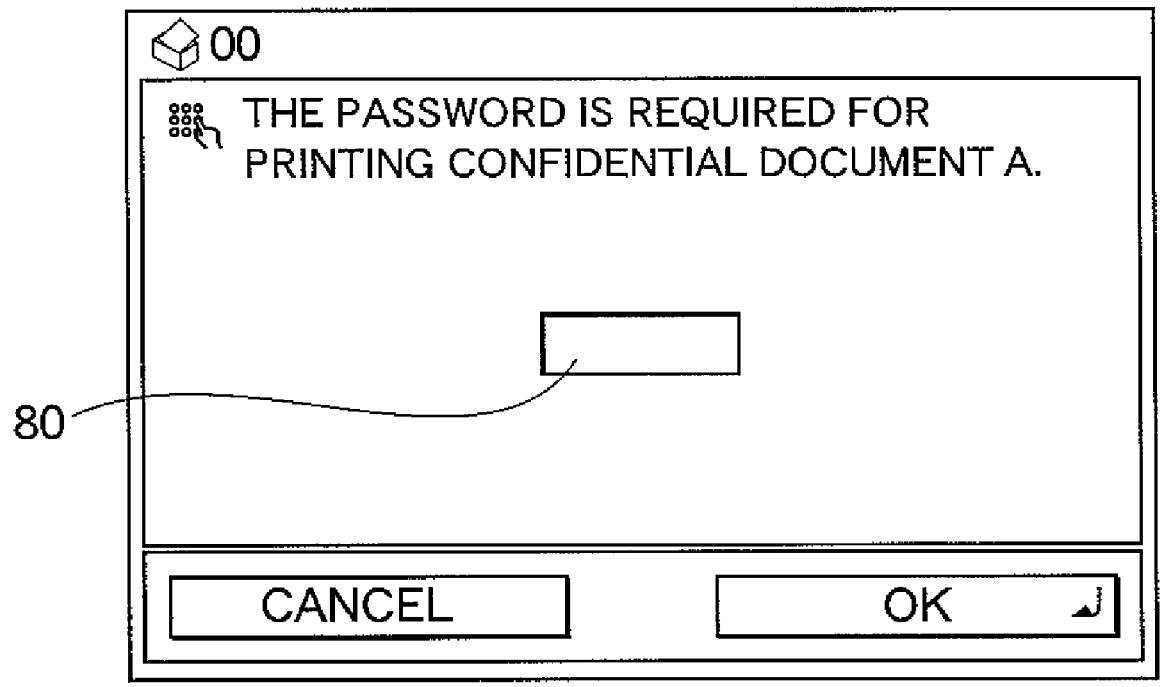
FIG. 8 is a diagram showing a password request screen displayed on the operating section in the MFP of FIG. 2.

FIG. 6 is a flowchart showing the process executed by the MFP 11 of FIG. 2 when the additional printing is performed. FIG. 7 is a diagram showing a document selection screen displayed on the operating section 23 in the MFP 11 of FIG. 2. FIG. 8 is a diagram showing a password request screen displayed on the operating section 23 in the MFP of FIG. 2.

If the additional printing of the above described document is performed, an operator selects the print job stored in the memory section 27 by operating the operating section 23 in the MFP 11. For causing the operator to select the stored print job, the document selection screen as shown in FIG. 7 is displayed on a display panel of the operating section 23 (step S21). Document names of the stored documents and the like are displayed in a display area 70 on the document selection screen.

On the document selection screen of FIG. 7, the document to be printed is selected, and "Print" button is depressed. Then the password request screen as shown in FIG. 8 is displayed to prompt to input the password. This password is the password which has been set in the step S13 in FIG. 3. When the password is inputted, the additional printing is executed (step S23). This additional printing is a printing for the print job involving the printing of the copy number from the subsequent number of the number of printed copies (a printing with copy number printing), with reference to the number of printed copies information stored in the step S16 in FIG. 3. When the additional printing for the specified number of copies is completed, the print job is stored as the job attached to the password in the memory section 27, similarly to the step S16. At this point, the number of printed copies stored in the step S16 added with the number of additionally printed copies, that is, an updated value of the number of printed copies information, is stored in the memory section 27 as an attribute of the print job (step S24), and this process is completed.

It should be noted that the input screen as shown in FIG. 5 illustrates the case where a hard disk in the MFP 11 is used as the memory section 27, and a different input screen is provided if the print job is inputted as a waiting job attached with the password in the print cue. Moreover, the box number may not be explicitly specified as shown in FIG. 5, and the box number may be set from the operating section 23 in the MFP 11.

According to this embodiment, in the case where the highly confidential document is printed by using the copy number printing function, when the printing according to the number of copies specified at the time of the printing is completed, the print job is stored as the job attached to the password (the job requiring the authentication for executing the printing thereof) in the memory section 27 of the printing apparatus. At this point, the number of printed copies information showing how many copies of the document have been printed, that is, what numbers of the copy number have been used, is also stored as the attribute of the job in the memory section 27 (step S16). Afterward, when the additional printing of the same document is performed, the job stored in the memory section 27 is invoked, and the authentication is performed to perform the printing. When this additional printing is executed, with reference to the number of printed copies information stored in the memory section 27, the copy number printing is executed from the subsequent copy number so that the copy number is successive (step S23).

Thereby, in the case where the printing is performed by using the copy number printing function, it is possible to securely avoid a problem in which the same copy number is printed on the same document. Therefore, the operator can perform the printing with a unique copy number to be printed, even without considering what numbers of the copy number have been currently used. In addition, in the printing of the document shared among multiple users, each of the users sharing the document can perform the printing with the unique copy number to be printed, without considering the current copy number of the document.

In a second embodiment of the present invention, in the case where the printing of a document is performed by using the copy number printing function, the printable number of copies has been previously set, and if the number of printed copies exceeds the printable number of copies, the job is stored as "the job attached with the password" in the printing apparatus.

Figure 9:
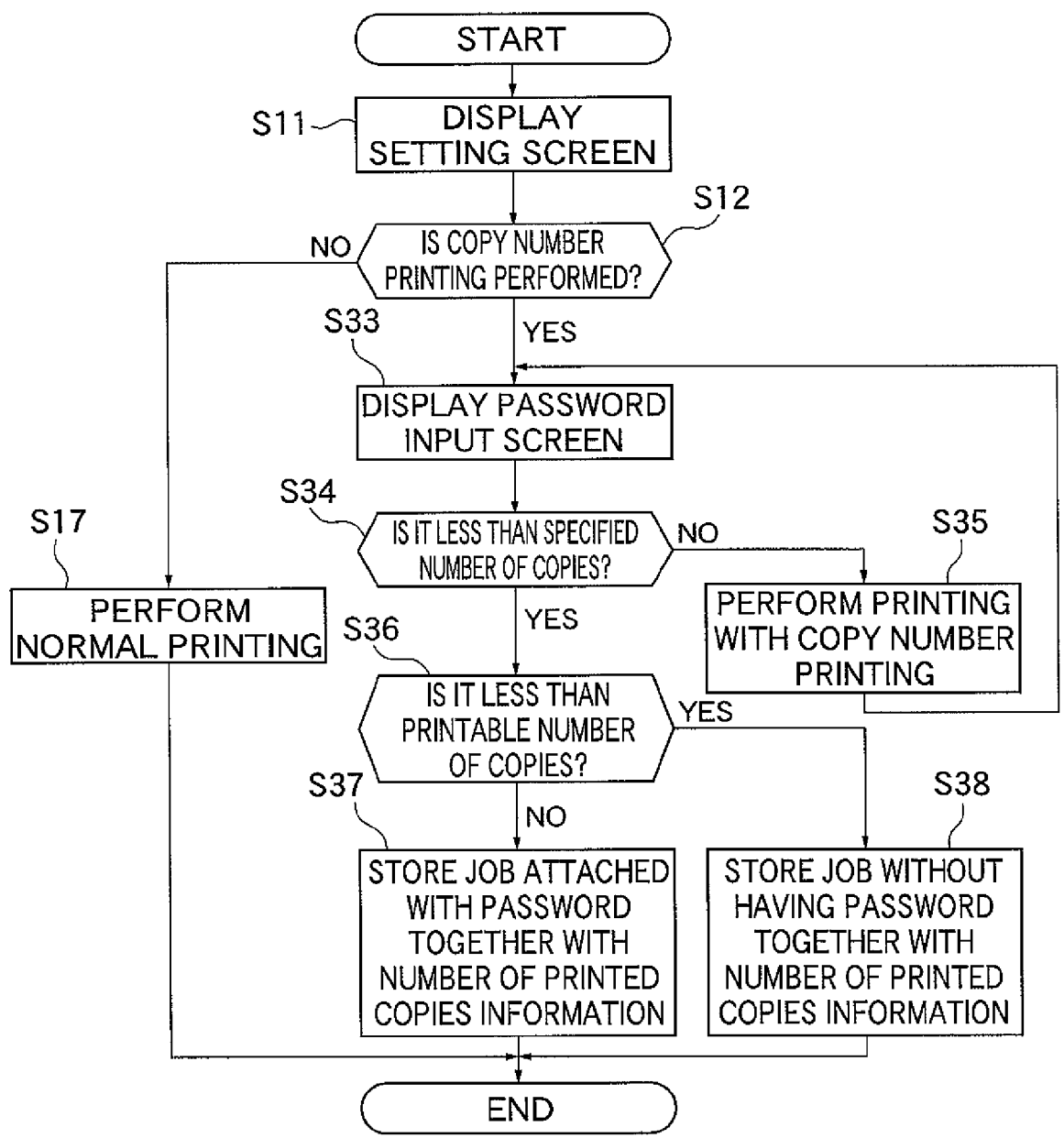
FIG. 9 is a flowchart showing a printing process of the printing system including the printing apparatus (MFP) according to a second embodiment of the present invention when the print job is inputted therein.
Figure 10:
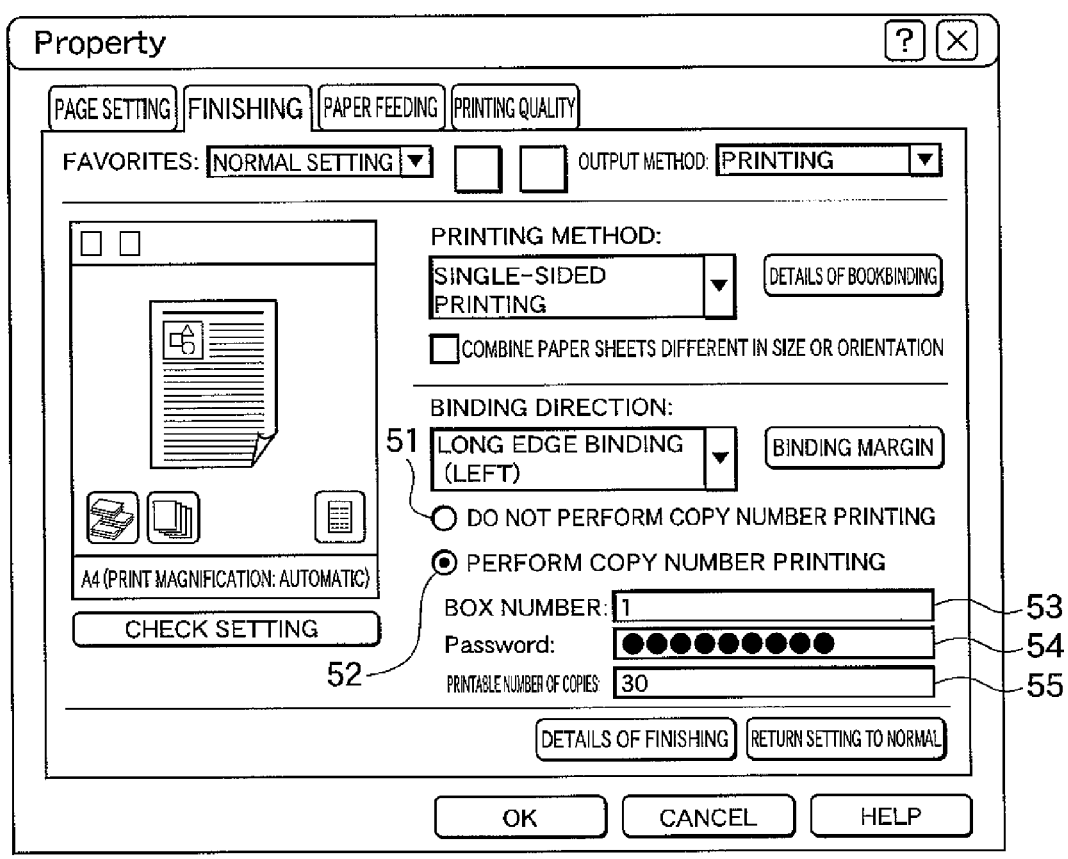
FIG. 10 is a diagram showing a box number/password input screen displayed on the client PC in the printing process of FIG. 9.

FIG. 9 is a flowchart showing a printing process of a printing system including a printing apparatus (MFP) according to the second embodiment of the present invention when the print job is inputted therein. Steps identical to those in FIG. 3 are designated by identical step numbers, and description thereof is omitted. The printing system according to the second embodiment has fundamentally the same construction as the first embodiment described above, and therefore corresponding elements are designated by identical reference numerals and description thereof is omitted. FIG. 10 is a diagram showing a box number/password input screen displayed on the client PC 12 in the printing process of FIG. 9.

In FIG. 9, when the radio button 52 for "Perform copy number printing" is selected on the setting screen shown in FIG. 4 (YES to the step S12), the input screen as shown in FIG. 10 is displayed on the panel of the operating section 23. At this point, an input area 55 for "the printable number of copies" as well as the input area 53 for "Box number" and the input area 54 for "Password" become the input waiting state to prompt the operator to input the box number, the password and the printable number of copies (step S33). When the operator inputs the box number, the password and the printable number of copies and starts the printing with respect to a document, it is determined whether or not the number of copies for which the print job has been executed is less than the specified number of copies for the copy number printing. If the number of copies for which the print job has been executed is less than the specified number of copies for the copy number printing, a printing for the print job involving the copy number printing is executed in accordance with the specified number of copies (step S35).

If the number of copies for which the print job has been executed is not less than the specified number of copies for the copy number printing, that is, if the printing according to the specified number of copies is completed (NO to the step S14), it is determined whether or not the number of printed copies is less than the set printable number of copies (step S36). If the number of printed copies is not less than the set printable number of copies, the print job is stored as the job attached to the password in the memory section 27 (step S37). If the number of printed copies is less than the printable number of copies, the print job is stored as the job without having the password (a job not requiring the authentication for executing the printing thereof) in the memory section 27 (step S38). Furthermore, in the process in the steps S37 and S38, as an attribute of the print job, the information showing the number of printed copies (number of printed copies information) is stored in the memory section 27 in association with the print job, and this process is completed.

Next, the case of performing the additional printing will be described.

Figure 11:
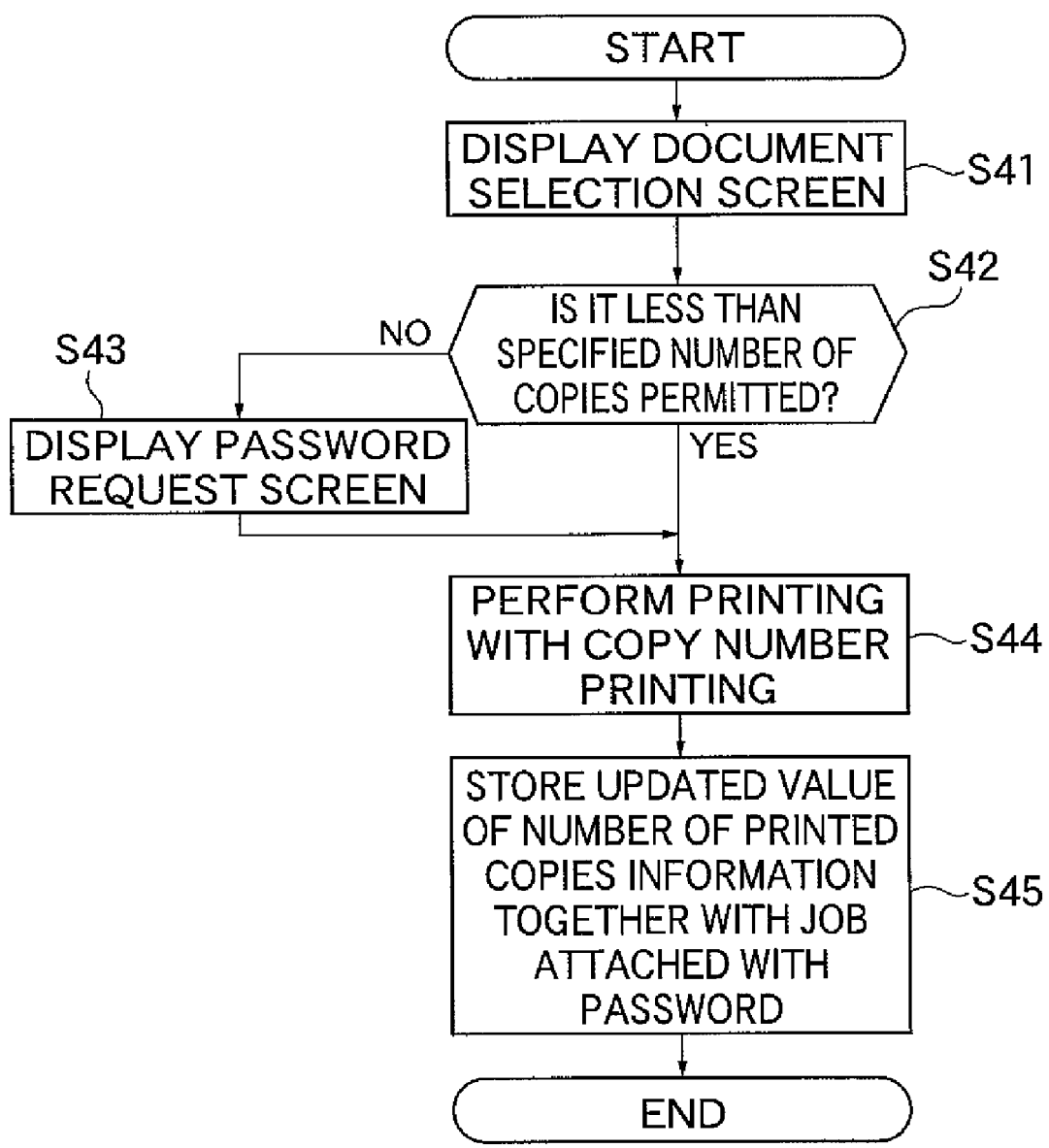
FIG. 11 is a flowchart showing a process executed by the MFP according to the second embodiment when the additional printing is performed.

FIG. 11 is a flowchart showing a process executed by the MFP 11 according to the second embodiment when the additional printing is performed. In addition, FIG. 12 is a diagram showing a document selection screen displayed on the operating section 23 in the MFP 11 according to the second embodiment.

If the additional printing of the above described predetermined document is performed, the operator selects the print job stored in the memory section 27 by operating the operating section 23 in the MFP 11. For causing the operator to select the stored print job, the document selection screen as shown in FIG. 12 is displayed on the display panel of the operating section 23 (step S41). In a display area 120 on the document selection screen, an area 71 is provided in which the number of printed copies and the printable number of copies corresponding to the respective document names of the stored documents are displayed.

Figure 12:
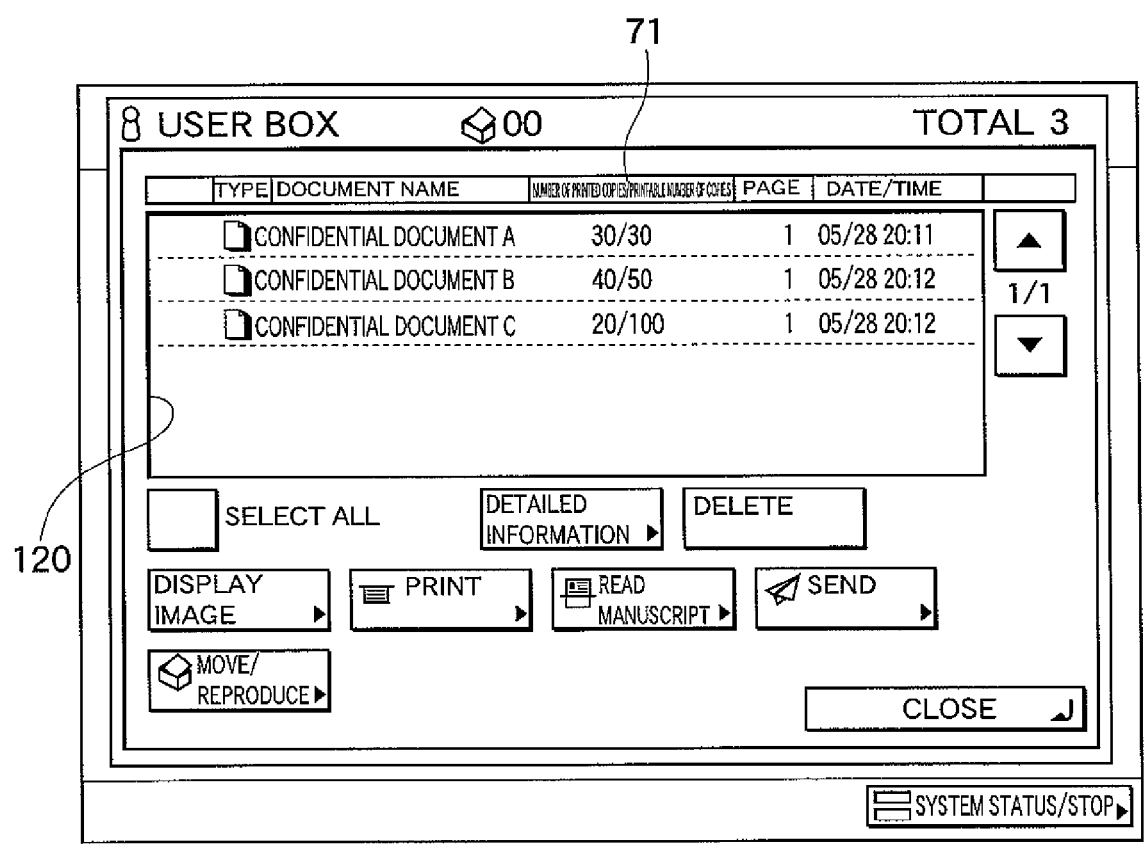
FIG. 12 is a diagram showing a document selection screen displayed on the operating section in the MFP according to the second embodiment.

On the document selection screen of FIG. 12, the job for the document to be printed is selected by the operator, and a "Print" button is depressed. At this point, it is determined whether or not the number of printed copies of the document is less than the printable number of copies set in the step S33 in FIG. 9 (step S42), and if the printable number of printed copies is not less than the printable number of copies, the password request screen as shown in FIG. 8 is displayed to prompt to input the password (step S43).

When the password is inputted, the additional printing is started. At this point, with reference to the number of printed copies information stored in the step S37 of FIG. 9, the additional printing for the print job is executed while printing the copy number from the subsequent number of the number of printed copies (a printing with copy number printing) (step S44). In addition, the print job is stored as the job attached to the password in the memory section 27 similarly to the step S37 in FIG. 9. At this point, the number of printed copies stored in the step S37 added with the number of additionally printed copies, that is, an updated value of the number of printed copies information, is stored in the memory section 27 as an attribute of the print job (step S45), and this process is completed.

On the other hand, if the number of printed copies of the document is less than the set printable number of copies (YES to the step S42), the process in the step S43 is skipped and the printing with copy number printing is started (step S44). In this printing with copy number printing, the print job is stored as the job without having the password in the memory section 27, until the number of printed copies exceeds the set printable number of copies. When the number of printed copies exceeds the set printable number of copies, the print job is stored as the job attached to the password in the memory section 27. At this time, the number of printed copies information stored in the step S37 added with this number of additionally printed copies, that is, an updated value of the number of printed copies information, is stored as an attribute of the print job, and this process is completed.

According to the second embodiment, in the case where a document is performed by using the copy number printing function, the printable number of copies is set by an owner of the document, and the print job is stored in the memory section 27 of the printing apparatus. Then, each time the print job is invoked and the printing is performed, the printing involving the copy number printing is performed, and furthermore the number of printed copies is counted up. When the number of printed copies exceeds the printable number of copies, the print job attached to the password (the job requiring the authentication for executing the printing thereof) is stored (steps S36 and S37). This makes it possible to increase the degree of freedom in security management, in comparison with the first embodiment.

In a third embodiment, in the configuration of FIGS. 1 and 2, when a document is inputted into the MFP 11 at the setting for using the copy number printing function, even if the document has already been inputted as the print job in the MFP 11, the printing with copy number printing can be suitably performed.

Figure 13:
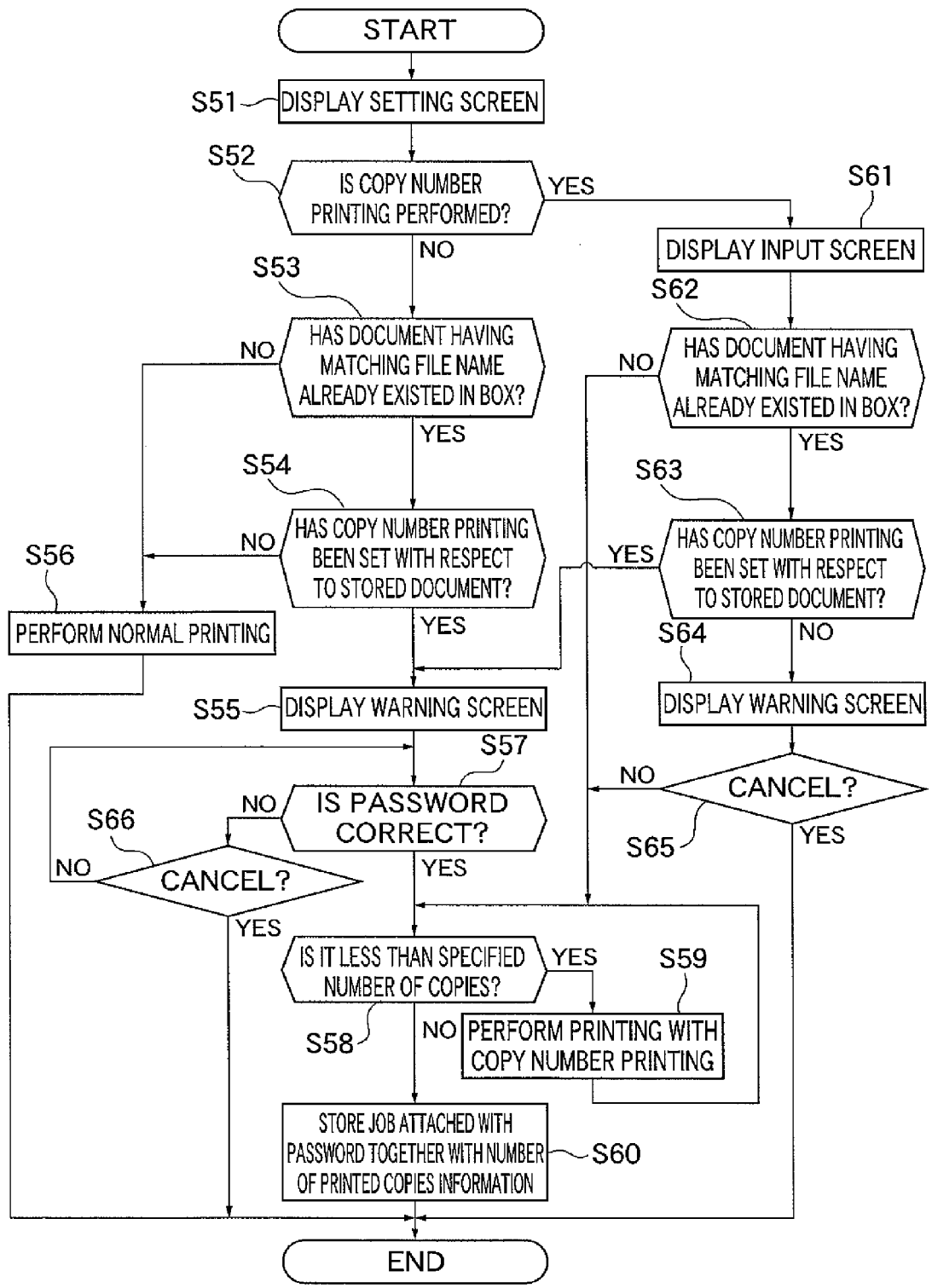
FIG. 13 is a flowchart showing a printing process of the printing system including the printing apparatus (MFP) according to a third embodiment of the present invention when the print job is inputted therein.
Figure 14A:
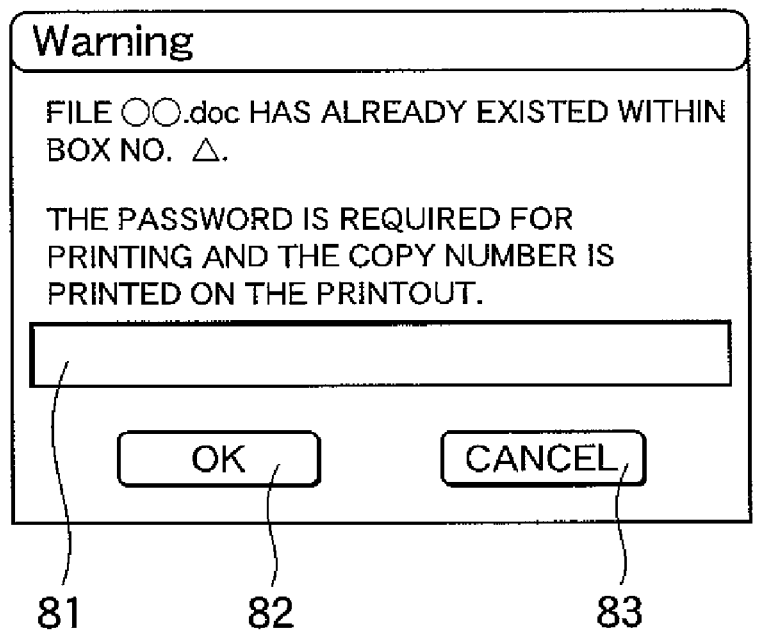
FIGS. 14A and 14B are diagrams showing warning screens displayed on the client PC in the printing process of FIG. 13, respectively.
Figure 14B:
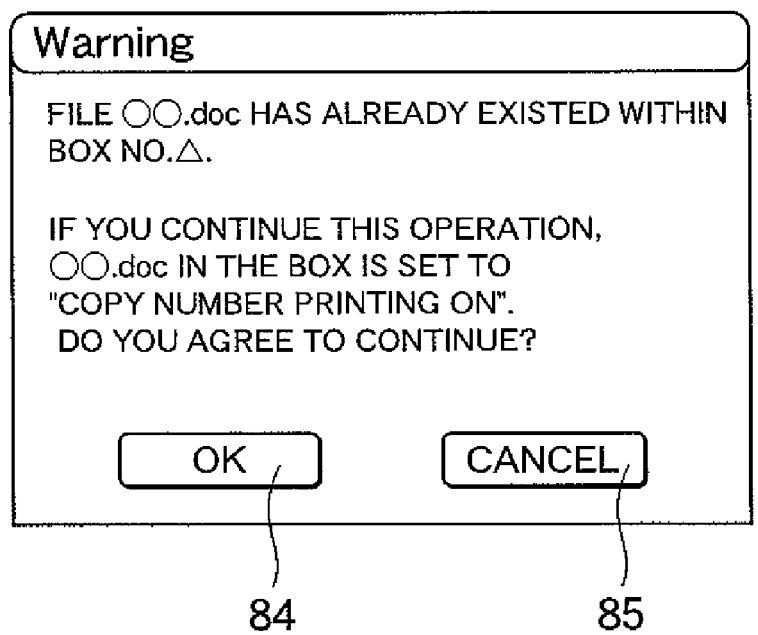

FIG. 13 is a flowchart showing a printing process of a printing system including a printing apparatus (MFP) according to the third embodiment of the present invention when the print job is inputted therein. The printing system according to the third embodiment has fundamentally the same construction as the first embodiment described above, and therefore corresponding elements are designated by identical reference numerals and description thereof is omitted. FIGS. 14A and 14B are diagrams showing warning screens displayed on the client PC 12 in the printing process of FIG. 13, respectively.

First, the printer driver of the client PC 12 performs the process similar to the process at steps S11 and S12 of FIG. 3 in the above described first embodiment (steps S51 and S52). If the radio button 51 for "Do not perform copy number printing" is selected on the setting screen shown in FIG. 4, it is determined whether or not a document matching the document to be printed by the operator has already existed in the memory section 27 of the MFP 11 (step S53). If there is no matching document, the MFP 11 performs the normal printing for the specified number of copies, without performing the printing with copy number printing, with respect to the document (step S56). If the matching document has existed, it is determined whether or not the setting for the copy number printing (setting to perform the copy number printing) has been performed with respect to the document (step S54). If the setting for the copy number printing has not been performed, the MFP 11 performs the normal printing for the specified number of copies, without performing the printing with copy number printing, with respect to the document (step S56), and this process is completed.

On the other hand, if the setting for the copy number printing has been performed (YES to the step S54), the client PC 12 displays the warning screen as shown in FIG. 14A to inform that the document having the setting for the copy number printing has already been stored in the box of the MFP 11 (step S55). At this time, the warning screen also simultaneously informs that the password is required for the printing, and requests the password for the printing. When the password is inputted in an input area 81 and an OK button 82 is depressed on the warning screen of FIG. 14A by the operator, it is determined whether or not the inputted password is correct (step S57). If the inputted password is correct, the process proceeds to step S58 or later, and the MFP 11 uses the print job of the document stored in the box to perform the printing. If a cancel button 83 is selected at the time point of inputting the password, the printing is not performed. Here, the password requested in the step S55 is the password which has been set in the step S13 when the print job has been previously stored in the box according to the above described flowchart of FIG. 3.

If the printing is started and the number of copies for which the print job has been executed is less than the specified number of copies for the copy number printing (YES to the step S58), the MFP 11 executes the printing for the print job involving the copy number printing (printing with copy number printing) for the specified number of copies (steps S58 and S59). This printing is the printing for the print job involving the printing of the copy number from the subsequent number of the number of printed copies, with reference to the number of printed copies information on the document already stored in the box. Then, if the number of copies for which the print job has been executed is not less than the specified number of copies for the copy number printing, that is, when the printing for the specified number of copies is completed (NO to the step S58), the print job is stored again as the job attached to the password in the memory section 27 (step S60). Also at this point, the number of printed copies stored at the step S16 added with this number of additionally printed copies, that is, the updated value of the number of printed copies information, is stored as the attribute of the print job.

On the other hand, if the radio button 52 for "Perform copy number printing" is selected in the step S52, the client PC 12 displays the input screen as shown in FIG. 5 to prompt the operator to input the box number and the password (step S61). Next, it is determined whether or not the print job of the document matching the document to be printed by the operator has already existed in the memory section 27 of the MFP 11 (step S62).

In the step S62, if there is no print job of the matching document, the process proceeds to the flow in the step S58 or later. If there is the print job of the matching document, it is determined whether or not the setting for the copy number printing has been performed with respect to the matching document in the box (step S63). If the setting for the copy number printing has been performed, the process proceeds to the step S55, and the warning screen as shown in FIG. 14A is displayed to inform that the print job of the document having the setting for the copy number printing has already been stored in the box of the MFP 11. Also the warning screen simultaneously informs that the password is required for the printing, and requests the password for the printing.

It should be noted that the flow in the step S55 or later is similar to the above description. If the setting for the copy number printing has not been performed in the step S63, the warning screen as shown in FIG. 14B is displayed to inform that the print job of the document without having the setting for the copy number printing has already been saved in the box of the MFP 11. Also the warning screen simultaneously informs that the setting for the copy number printing with respect to the corresponding document stored in the box is changed to ON (step S64). If an OK button 84 is depressed to continue the printing on the warning screen shown in FIG. 14B, the process proceeds to the flow in the step S58 or later, and if a cancel button 85 is depressed, the printing is not performed (step S65).

According to the third embodiment, if a document is inputted into the printing apparatus at the setting for using the copy number printing function, when the document has already been inputted as the print job in the printing apparatus, the matching of the document is performed. If the print job of the matching document exists in the memory section 27 of the printing apparatus, the warning screen is displayed to inform the operator that the print job of the matching document exists in the memory section 27. Then, if the copy number printing is performed from the subsequent copy number, with reference to the corresponding job and the number of printed copies information stored in the memory section 27, the printing is performed while printing the copy number from the subsequent copy number so that the copy number may be successive.

In this way, in the case where a document is inputted into the printing apparatus at the setting for using the copy number printing function, even when the document has already been inputted as the print job in the printing apparatus, it is possible to securely avoid the problem in which the same copy number is printed on the same document.

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read and execute the program code stored in the storage medium.

In this case, the program code itself read from the storage medium realizes the functions of any of the embodiments described above, and hence the program code and the storage medium in which the program code is stored constitute the present invention.

Example of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiments may be accomplished not only by executing a program code read by a computer, but also by causing an OS (operating system) or the like which operates on the computer to perform a part or all of the actual operations based on instructions of the program code.

Further, it is to be understood that the functions of the above described embodiments may be accomplished by writing a program code read from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-064050, filed Mar. 9, 2006, which is hereby incorporated by reference herein in its entirety.

What is claimed is:

1. A printing apparatus having a copy number printing function for printing a copy number on a printout of a print job of a document, the printing apparatus comprising:

a storage unit adapted to store a number of printed copy information together with a document set with a copy number printing for a print job;

a display unit; and a controller programmed to:

determine whether or not the copy number printing is to be performed on a printout of one print job;

determine whether or not a document matching the printout of the one print job is stored in the storage unit when the controller determines that the copy number printing is to be performed on the printout of the one print job;

determine whether or not the copy number printing on the printout of the stored one print job has been set when the controller determines that the matching document is stored in the storage unit; and display a first screen in the display unit for inputting a password when the controller determines that the copy number printing to be performed on the printout of the one print job has been set;

display a second screen in the display unit displaying that the copy number printing will be performed on the printout of the one print job and allowing a user to instruct whether to continue with the one print job when the controller determines that the matching document is stored in the storage unit but the copy number printing to be performed on the printout of the one print job has not been set; and perform the copy number printing of the one print job based on the number of printed copy information of the matching document stored in the storage unit, and update the number of printed copy information based on the number of printed copies when a correct password is input through the first screen or when performed printing through the second screen.

2. The printing apparatus according to claim 1, wherein the controller is further programmed to:

determine whether or not a document matching a printout of the one print job is stored in the storage unit when the controller determines that copy number printing is not to be performed; and determine whether or not the copy number printing on the printout of the stored one print job has been set when the controller determines that the matching document is stored in the storage unit;

perform a normal printing when the controller determines that the copy number printing on the printout of the stored one print job has not been set; and display the first screen in the display unit for inputting the password when the controller determines that the copy number printing to be performed on the printout of the one print job has been set.

3. A method of controlling a copy number printing for a printing apparatus having a copy number printing function for printing a copy number on a printout of a print job of a document, a storage unit adapted to store a number of printed copy information together with a corresponding document set with a copy number printing for a print job, a display unit, and a controller, the controller performing the method comprising:

a first determining step of determining whether or not the copy number printing is to be performed on a printout of one print job;

a second determining step of determining whether or not a document matching the printout of the one print job is stored in the storage unit when the first determining step determines that the copy number printing is to be performed on the printout of the one print job;

a third determining step of determining whether or not the copy number printing on the printout of the stored one print job has been set when the second determining step determines that the matching document is stored in the storage unit;

a first displaying step of displaying a first screen in the display unit for inputting a password when the third determining step determines that the copy number printing to be performed on the printout of the one print job has been set;

a second displaying step of displaying a second screen in the display unit displaying that the copy number printing will be performed on the printout of the one print job and allowing a user to instruct whether to continue with the one print job when the second determining step determines that the matching document is stored in the storage unit but the third determining step determines that the copy number printing to be performed on the printout of the one print job has not been set; and a copy number printing step of performing the copy number printing of the one print job based on the number of printed copy information of the matching document stored in the storage unit, and updating the number of printed copy information based on the number of printed copies when a correct password is input through the first screen or when performed printing through the second screen.

4. A non-transitory computer-readable medium storing a computer program executable by a printing apparatus having a copy number printing function for printing a copy number on a printout of a print job of a document, a storage unit adapted to store a number of printed copy information together with a corresponding document set with a copy number printing for a print job, a display unit, and a controller, the program being executable by the controller to carry out a method comprising the steps of:

a first determining step of determining whether or not the copy number printing is to be performed on a printout of one print job;

a second determining step of determining whether or not a document matching the printout of the one print job is stored in the storage unit when the first determining step determines that the copy number printing is to be performed on the printout of the one print job;

a third determining step of determining whether or not the copy number printing on the printout of the stored one print job has been set when the second determining step determines that the matching document is stored in the storage unit;

a first displaying step of displaying a first screen in the display unit for inputting a password when the third determining step determines that the copy number printing to be performed on the printout of the one print job has been set;

a second displaying step of displaying a second screen in the display unit displaying that the copy number printing will be performed on the printout of the one print job and allowing a user to instruct whether to continue with the one print job when the second determining step determines that the matching document is stored in the storage unit but the third determining step determines that the copy number printing to be performed on the printout of the one print job has not been set; and a copy number printing step of performing the copy number printing of the one print job based on the number of printed copy information of the matching document stored in the storage unit, and updating the number of printed copy information based on the number of printed copies when a correct password is input through the first screen or when performed printing through the second screen.

* * * * *